United States Patent

Strier et al.

[15] 3,661,645
[45] May 9, 1972

[54] POLYTETRAFLUOROETHYLENE BATTERY SEPARATOR AND METHOD FOR PRODUCING SAME

[72] Inventors: Murray P. Strier, Niagara Falls, N.Y.; Joseph S. Smatko, Santa Barbara, Calif.

[73] Assignee: McDonnell Douglas Corporation, Santa Monica, Calif.

[22] Filed: Apr. 13, 1970

[21] Appl. No.: 27,904

Related U.S. Application Data

[63] Continuation-in-part of Ser. No. 6,409, Jan. 28, 1970.

[52] U.S. Cl.................................136/20, 136/146, 136/148, 260/2.5 M, 264/49
[51] Int. Cl. ........................................................H01m 3/02
[58] Field of Search .................136/146, 148, 20; 260/2.5 M; 264/49, 127

[56] References Cited

UNITED STATES PATENTS

| | | | |
|---|---|---|---|
| 3,281,511 | 10/1966 | Goldsmith | 264/49 |
| 3,202,733 | 8/1965 | Strauss | 136/146 |
| 3,407,249 | 10/1968 | Landi | 136/86 |
| 3,536,796 | 10/1970 | Rock | 260/2.5 M |
| 2,400,091 | 5/1946 | Alfthan | 260/2.5 M |
| 2,997,448 | 8/1961 | Hochberg | 260/2.5 M |
| 3,518,332 | 6/1970 | Sklarchuk et al | 260/2.5 M |

*Primary Examiner*—Donald L. Walton
*Attorney*—Max Geldin

[57] ABSTRACT

Method for producing an improved battery separator, specifically a microporous polytetrafluoroethylene separator, having high ionic conductivity, and having a highly uniform porous structure, by mixing an aqueous dispersion of a substance which is insoluble in water and which does not precipitate or coagulate polytetrafluoroethylene from aqueous dispersion, e.g., zinc oxide, with an aqueous dispersion of polytetrafluoroethylene, casting a film of such mixture, drying the film, sintering the dried film, forming a polytetrafluoroethylene film with particles of such substance, e.g., zinc oxide, uniformly distributed in such film, and removing the particles of such substance from the polytetrafluoroethylene film, e.g., removing zinc oxide particles from the film by leaching with aqueous alkali. The resulting flexible film or separator produced by such process.

19 Claims, 3 Drawing Figures

Patented May 9, 1972

3,661,645

MURRAY P. STRIER
JOSEPH S. SMATKO
INVENTORS

BY Max Gelden

ATTORNEY

POLYTETRAFLUOROETHYLENE BATTERY SEPARATOR AND METHOD FOR PRODUCING SAME

This application is a continuation-in-part of our co-pending application Ser. No. 6,409, filed Jan. 28, 1970.

This invention relates to production of highly flexible microporous polytetrafluoroethylene films having a uniform distribution of pores and having high ionic conductivity, designed especially for use in batteries, particularly high energy density batteries. The invention especially concerns procedure for producing the above flexible microporous polytetrafluoroethylene films, and to the resulting films for use as battery separators, and to batteries, especially high energy density batteries, embodying such improved microporous polytetrafluoroethylene separators.

Batteries are an important source of energy storage for power generation. An important type of battery particularly suited for such applications are the high energy density alkaline electrolyte cells such as the silver-zinc, zinc-air and nickel-zinc batteries. High energy density batteries are generally battery systems which have a substantially higher energy per unit of weight than conventional, e.g., lead, storage batteries. In addition to important air-borne applications, such high energy density batteries have many other applications such as in portable tools and appliances, television, radio and record player, engine starting, portable X-ray units, and the like.

In high energy density batteries such as silver-zinc batteries, the electrodes are placed adjacent opposite sides of a membrane or separator which performs the function of retaining electrolyte, separating the electrodes, and permitting transfer of electrolyte ions while inhibiting migration of electrode ions which short circuit the battery. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

In U.S. Pat. No. 3,364,077 to Arrance, et al. there is disclosed an improved battery separator comprising a fibrous inorganic material, particularly potassium titanate, combined with tetrafluoroethylene polymer, either in the form of such inorganic fibrous material, e.g., potassium titanate fibers, mixed with the tetrafluoroethylene polymer, or wherein the separator comprises a membrane formed of fibrous inorganic material, e.g., fibrous potassium titanate, and a thin sheet of microporous tetrafluoroethylene polymer in contact with a surface of such membrane. Although the resulting separators have good resistance to chemical attack, and improved strength and flexibility, those separators which are produced according to this patent by mixing, e.g., potassium titanate fibers, with tetrafluoroethylene polymer in powder form, followed by bonding the mixture at high pressures and elevated temperatures, do not have high flexibility, and the combined inorganic material-tetrafluoroethylene polymer separators of such patent do not possess as high ionic conductivity as is desired for many applications wherein such separators are employed in high energy density batteries.

Flexible substantially inorganic separators are disclosed in U.S. application Ser. No. 676,224, now abandoned, filed Oct. 18, 1967, by C. Berger, et al., consisting essentially of a major portion of a porous inorganic material such as a sintered porous solid solution of magnesium silicate and iron silicate, and a minor portion of a water coagulable organic fluorocarbon polymer such as vinylidene fluoride polymer, the polymer bonding the particles of the inorganic material together and forming a flexible membrane. However, such membrane is cast from a mixture of the inorganic powder and a volatile solvent which dissolves the polymer, such as dimethyl acetamide. However, polytetrafluoroethylene cannot be employed as a practical matter in the procedure of this application, since it is generally not soluble in organic solvents, and the resulting separator of the above Ser. No. 676,224 application does not have the desired high ionic conductivity particularly desirable for use of such separators in high energy density batteries, in certain instances.

Although commercially available polytetrafluoroethylene film has inertness to battery electrolyte, particularly alkali electrolyte employed in high energy density batteries, high resistance to oxidation, and good thermal stability, such commercially available polytetrafluoroethylene films do not have the requisite high ionic conductivity for use as battery separators, particularly in high energy density batteries. It is a particular object of the present invention to provide procedure for producing polytetrafluoroethylene film having appropriately developed and uniform microporosities and which can be readily wetted by the electrolyte, particularly alkali electrolyte, to yield highly conductive and highly flexible efficient battery separators.

In our above co-pending application Ser. No. 6,409, an electrode material-binder combination, particularly in the form of a zinc oxide-polytetrafluoroethylene film, is produced by employing aqueous dispersion or aqueous emulsion technology based on the mixing of a fluorocarbon emulsion, e.g., polytetrafluoroethylene emulsion, with an electrode material suspension, such as a zinc oxide suspension, to obtain fine dispersion of the electrode material, such as zinc oxide, substantially uniformly throughout the polymer binder or matrix. The aqueous dispersion of electrode material and binder is cast to produce a film, and such film is dried, sintered and finally rolled to provide a fibrous binder structure, e.g., a polytetrafluoroethylene film, containing particles of the electrode material, e.g., zinc oxide, distributed and encapsulated therein.

The present invention also takes advantage of the use of the above described aqueous dispersion technology of our above copending applications, to uniformly distribute particles of a substance such as zinc oxide in a polytetrafluoroethylene film, but after such film is cast and sintered, removing the particles of uniformly distributed substance, e.g. zinc oxide, as by leaching, for example with alkali or acid, leaving a microporous polytetrafluoroethylene film which applicants unexpectedly have found has a highly uniformly developed pore structure such that when such microporous polytetrafluoroethylene film is employed as a separator in a high energy density battery employing an alkaline electrolyte such as aqueous KOH, such separator is readily wetted by the electrolyte and has very high conductivity, and correspondingly low resistivity, e.g., less than about 10 ohm-cm.

As will be pointed out in detail below, although zinc oxide particles are preferred for incorporation and distribution into the polytetrafluoroethylene film by aqueous dispersion technology, followed by removal therefrom, other particulate substances can be employed for this purpose as described in detail hereinafter, and including alternative means for removal of such particles from the film, to leave the microporous polytetrafluoroethylene film according to the invention.

Thus, the process of the present invention for preparing flexible microporous polytetrafluoroethylene film of high ionic conductivity and having uniformly distributed pores, comprises forming an aqueous mixture of particles of polytetrafluoroethylene and particles of a substance insoluble in water and which does not precipitate or coagulate polytetrafluoroethylene from aqueous dispersion, and which when incorporated into a polytetrafluoroethylene film can be removed therefrom to form a porous film, casting a film of said mixture, such substance preferably having a fine particle size, drying said film, sintering said dried film at temperature at which substantially no decomposition of said polytetrafluoroethylene occurs, forming a polytetrafluoroethylene film with particles of said substance bonded by and uniformly distributed in said film, and removing said particles of said substance from said polytetrafluoroethylene film without otherwise adversely affecting said polytetrafluoroethylene film, and forming a polytetrafluoroethylene film having uniformly distributed pores therein.

When employing the preferred zinc oxide particles for uniform distribution in the polytetrafluoroethylene film according to the invention process, as will be described in greater detail hereinafter, polytetrafluoroethylene films of high efficiency and very low resistivity rendering them particularly suitable for use as battery separators, are produced by removing the zinc oxide particles distributed in the sintered polytetrafluoroethylene film by leaching with alkali, e.g., KOH, preferably with pre-treatment of such sintered zinc oxide-containing polytetrafluoroethylene film first with acetone, then with methanol, and also preferably followed by treatment with a methanol-alkali solution, prior to final treatment with aqueous alkali, e.g., KOH, solution.

However, any substance can be employed in place of zinc oxide for incorporation into the polytetrafluoroethylene film according to the invention process, which is insoluble in water and which does not precipitate or coagulate polytetrafluoroethylene from aqueous dispersion, and which has a sufficiently fine particle size to form the desired microporous structure in the polytetrafluoroethylene film, following removal of such particles from the film according to the invention principles. Such substances incorporated in the polytetrafluoroethylene film must be capable of being readily removed from the sintered polytetrafluoroethylene film by suitable means such as by dissolution or leaching, or by reaction with suitable chemical agents to form reaction products which are readily removed from the film, without adversely affecting the polytetrafluoroethylene film.

Thus, there can be employed a metal or a compound such as zinc, zinc oxide, nickel, nickel oxide, cadmium, cadmium oxide, silver, silver oxide, lead oxide (PbO), lead carbonate, silica, glass fibers, mixtures thereof, and the like, in powder or particulate form. These particles can be removed from the polytetrafluoroethylene film in which they are distributed, by dissolution or leaching out by suitable means as by alkali, or acid, as for example in the case of cadmium oxide and nickel oxide by treatment with nitric acid, and in the case of nickel particles the film containing such nickel particles can be treated with a reacting gas such as carbon monoxide to form volatile nickel carbonyl, which leaves the film, and forms the microporous polytetrafluoroethylene film. Where silica powder or finely chopped glass fibers are employed, these substances can be later leached out with hydrofluoric acid. Although zinc oxide is soluble in acid such as hydrochloric or nitric acid, it is preferable to use alkali since alkalies do not have volatile fumes and since use of acid involves more complete removal of residues from the film prior to use of the film in an alkaline battery.

Organic particulate or powder materials also can be employed, such as for example microspheres of polystyrene, and such organic particles distributed in the polytetrafluoroethylene film can be removed by dissolution, e.g. by treatment with organic solvents which will remove such particulate organic materials distributed in the polytetrafluoroethylene film without adversely affecting said film, e.g., by treatment with toluene, benzene or chlorinated solvents. Also, phenol-formaldehyde microspheres can be used. After sintering the film, such microspheres can be leached out in concentrated hot sulfuric acid containing an oxidizing agent such as chromic acid or potassium permanganate.

As previously noted, the particles of the substance to be mixed in aqueous dispersion with polytetrafluoroethylene should have a particle size corresponding to the pore size of the pores to be formed in the microporous polytetrafluoroethylene film. Accordingly, particularly for application of the resulting microporous polytetrafluoroethylene film for use as a battery separator, such substance should have a particle size ranging from about 0.1 to about 200 $\mu$. However, where the microporous polytetrafluoroethylene film is to be employed in a high energy density alkaline electrolyte battery, requiring that such films have a sufficiently fine pore size so that the film functions as an ion screen to permit passage of electrolyte ions while inhibiting passage of electrode such as zinc ions, the particle size of the substance distributed in the polytetrafluoroethylene film and later removed to form pores of a corresponding size, should have a particle size substantially smaller than 200 $\mu$ and preferably less than about 50 $\mu$. Accordingly, it has been found that zinc oxide particles are particularly useful in this respect since zinc oxide is available in powder form with a particle size ranging from about 0.1 to about 10 $\mu$, so that when such zinc oxide particles are removed as by leaching with alkali from the sintered polytetrafluoroethylene film, a uniform distribution of corresponding fine pore sizes is provided in the resulting polytetrafluoroethylene film, rendering it particularly efficient as a battery separator in a high energy density alkaline battery.

In view of the preferred use of such zinc oxide particles, the process of the invention will be described hereinafter in terms of the use of zinc oxide, but as previously pointed out, it will be understood that the invention is not to be taken as limited to its use.

An aqueous dispersion or suspension of zinc oxide is provided, such suspension preferably having a consistency comparable to heavy cream, and an aqueous emulsion or dispersion of polytetrafluoroethylene is added to the aqueous dispersion of zinc oxide, to form an aqueous homogeneous mixture or dispersion of the zinc oxide particles and the polytetrafluoroethylene particles. The particle size of the polytetrafluoroethylene can vary, but generally ranges from about 0.01 to about 10 $\mu$.

The solids concentration in the resulting aqueous slurry, including zinc oxide and polytetrafluoroethylene, can vary substantially, and can range for example from about 10 to about 75 percent solids. The proportion of particles of the substance such as zinc oxide, to polytetrafluoroethylene, employed is such that generally, the mixture or slurry contains about 50 to about 95 percent of particles of the substance such as zinc oxide, and about 50 to about 5 percent of polytetrafluoroethylene, by weight. A particularly successful mixture according to the invention contains about 80 percent of the substance such as zinc oxide and about 20 percent of polytetrafluoroethylene, by weight.

Although in preferred practice an aqueous dispersion or suspension of the substance such as zinc oxide and polytetrafluoroethylene are separately provided and mixed, if desired, zinc oxide particles can be incorporated in an aqueous dispersion of polytetrafluoroethylene, employing a sufficient amount of water to maintain both the zinc oxide and the polytetrafluoroethylene particles in fine dispersion, particularly in the concentrations of these materials noted above. Also, a thick highly concentrated aqueous mixture of the substance such as zinc oxide can be produced and an aqueous dispersion of polytetrafluoroethylene added to it.

The homogeneous slurry or mixture of the substance such as zinc oxide and polytetrafluoroethylene particles is cast on a suitable preferably flat surface, e.g., a glass plate, as by pouring the slurry or mixture onto such plate employing suitable means such as a casting knife or doctor blade to obtain a desired thickness of film. However, any suitable casting procedure can be employed.

As an alternative, an aqueous paste of a substance such as zinc oxide can be blended with the aqueous polytetrafluoroethylene emulsion, and the resulting mixture in the form of a paste can be extruded in the form of a film.

Hence, the term "casting" employed in the specification and claims is intended also to include the above noted extrusion procedure.

The resulting cast or extruded film is then dried either at ambient temperature or at elevated temperature, preferably the latter, and at elevated temperature of say about 40° to about 100° C., such drying generally is carried out for a period from about 2 to about 24 hours.

The resulting dried film of zinc oxide-polytetrafluoroethylene matrix is then subjected to sintering at a temperature which does not cause decomposition of the polytetrafluoroethylene and to cause inter-particle bonding or welding of the polymer or resin matrix. Sintering temperatures can range generally from as low as 100° C. or even lower, factors about 375° C., depending on various actors including the particular substance, e.g., zinc oxide, employed, and preferably range from about 230° to about 275° C. A particularly useful sintering temperature range employed for a polytetrafluoroethylene film containing zinc oxide particles according to the invention, can range from about 260° to about 275° C. Usually such sintering is carried out for a period of from about 10 minutes to about 2 hours.

Following cooling of the resulting sintered film, and as an optional feature, a significant increase in film strength can be achieved by subjecting the film to rolling, that is the application of a roll, such as a cylinder or cylindrical rod, over the surface of the film. The advantage of such rolling is that it fully develops a fibrous or fibrillar structure in the polytetrafluoroethylene binder or film resulting in a strengthened film structure. The rolling can be carried out once or several times over the sintered film, in various directions, for example the film, e.g. a sintered zinc oxide-polytetrafluoroethylene composite film, can be subjected to application of a roll or cylindrical rod at least four times both in longitudinal and transverse directions. Thus, for example, a 1½- to 2-inch-diameter stainless steel rod 6 inch in length can be used to roll a film containing a 25 to 50 gram quantity of sintered zinc oxide-polytetrafluoroethylene mixture.

Alternatively, such rolling can be carried out by working the film mass on a rubber mill, preferably heated, the rolls in the rubber mill, especially if set at different speeds creating the necessary forces to stretch the binder into fibrillar or fibrous forms. Thus, a roll speed differential of 1:1 to 3:1 between the rolls can be employed.

Although the above noted rolling can be carried out at ambient or room temperature, in preferred practice the film is maintained at elevated temperature up to about 300° C., e.g. of the order of about 200° to about 300° C. with the roller preferably heated to the same temperature. The rolling procedure can take place over a period of from about 1 to about 10 minutes, the period of rolling depending upon the amount of shear stress applied and the amount of heat, if any, which is used during the rolling procedure.

The resulting sintered film, either with or without rolling, has particles of the substance such as zinc oxide uniformly dispersed or distributed throughout the polytetrafluoroethylene matrix or structure. In order to obtain films of increased thickness, following sintering of the film on the casting surface, e.g., glass plate, a second layer of slurry of particles such as zinc oxide and polytetrafluoroethylene is drawn down over the first film in the same manner as the first film. Once again, the above noted drying and sintering is carried out for the second film as in the case of the initial film. Finally, three-layer films can be prepared, if desired, by casting a third film layer over the second, followed by drying and sintering.

As a feature of the invention, particularly when employing a substance such as zinc oxide for dispersion in the polytetrafluoroethylene film, and which is leachable by alkali, it has been found that treatment of the sintered film prior to alkali leaching, with a ketone, particularly acetone, and with an alcohol, particularly methanol, functions to pre-wet the interface between the polytetrafluoroethylene matrix film and the particles of filler substance, e.g., zinc oxide, to permit admission subsequently of the aqueous alkali solution into the film to leach out such filler particles. If treatment with a ketone such as acetone and an alcohol such as methanol are not employed, then prolonged periods of treatment are required in aqueous alkali, e.g. KOH or NaOH, at elevated temperatures up to 100° C. to penetrate into the film and leach out the filler particles.

Subsequent leaching by alkali is also facilitated by treatment of the film following the above noted treatment with for example acetone and methanol, with alcoholic-alkali which further facilitates the admission of the aqueous alkali into the interface between the polytetrafluoroethylene and filler, e.g. zinc oxide particles, and facilitates rapid penetration by subsequent treatment with aqueous alkali.

Thus, according to preferred treatment, the sintered film containing the uniformly dispersed filler particles such as zinc oxide, is treated first with a ketone such as acetone, or methylethyl ketone, then with an alcohol such as methanol, ethanol or isopropanol, then with alcoholic KOH, particularly, methanolic KOH, and finally with an aqueous solution of alkali, e.g. KOH.

However, it is understood that although pretreatment with one or more of the above noted ketone, alcohol or alcoholic alkali solutions is preferred, any one or more, or all of the pre-treatment steps can be omitted and the sintered film containing the filler particles, e.g., zinc oxide, can be directly treated with aqueous alkali at either ambient or elevated temperature up to 100° C., to leach out the filler particles such as zinc oxide, to produce the microporous polytetrafluoroethylene film according to the invention.

The sintered polytetrafluoroethylene film containing the filler substance such as zinc oxide can be treated or soaked for varying intervals of time with one or more of the above noted pre-treating solutions, for example for a period of as little as about 10 seconds to about 30 minutes, usually about 1 to about 30 minutes, in each of the ketone, alcohol and alcoholic alkali solutions, depending upon the particular treating solutions employed, temperature of treatment and degree of agitation of the solutions, and whether using continuous or batch operation.

The essential feature of the invention for removing filler substances such as zinc oxide is carried out preferably in aqueous alkali, e.g., aqueous KOH or aqueous NaOH solution such as 30 to 40 percent aqueous solutions of such alkalies, although the strength of such aqueous alkali solutions can be below 30 percent or above 40 percent alkali concentration. The leaching procedure is prolonged at concentrations substantially below 30 percent because of lower solubility of the filler substance such as zinc oxide under these conditions, and if aqueous alkali solutions substantially above 40 percent concentration are employed, leaching rates are also lowered, in spite of increased solubility of the substance, e.g., zinc oxide, because of increased viscosity.

Prior to removal of leaching out of the filler particles such as zinc oxide from the polytetrafluoroethylene film, the conductivity of the polytetrafluoroethylene film containing such particles distributed therein is relatively poor. On the other hand, when the filler substance is removed as when the zinc oxide particles are leached out of the polytetrafluoroethylene film by alkali, a very marked and significant increase in conductivity and corresponding reduction in resistivity of the polytetrafluoroethylene film occurs, e.g., down to about 5 to about 15 ohm-cm.

Thus, for example a three layer polytetrafluoroethylene film containing zinc oxide particles, following sintering and prior to alkali leaching has a resistivity of 18,000 ohm-cm, and following leaching with alkali has a resistivity of only 7.6 ohm-cm.

The sintered polytetrafluoroethylene film both before leaching or removing of the particles of filler substance such as zinc oxide, and also following removal or leaching of the filler substance, is such that it can be readily folded without cracking and is highly flexible. The film thicknesses of the final microporous polytetrafluoroethylene film from which the filler substance such as zinc oxide is removed or leached out, can range from about 0.2 to about 50 mils, usually from about 0.5 to about 20 mils, the increased film thicknesses being provided as pointed out above by casting, drying and sintering successive layers of film containing a filler substance from the slurry or aqueous suspension of the filler substance such as zinc oxide and polytetrafluoroethylene. Of particular significance, following removal or leaching of the filler substance, the resulting microporous polytetrafluoroethylene film has a highly uniform distribution of pores, which as previously noted correspond to the particle sizes of the filler substance, e.g., zinc oxide particles, employed.

Thus, if a filler substance of relatively large pore size is employed, the pores of the polytetrafluoroethylene film can have a size up to 200 $\mu$, whereas employing the preferred zinc oxide particles of fine mesh size, the pore size of the Teflon film produced ranges from about 0.1 to about 10 $\mu$. A polytetrafluoroethylene film of relatively large pore size substantially greater than say 50 $\mu$ and up to about 200 $\mu$ can be employed as a separator in a lead-acid battery, but for preferred use in high energy density batteries such as silver-zinc, nickel-zinc, zinc-air, silver-cadmium, and nickel-cadmium batteries, for proper functioning of the polytetrafluoroethylene film as a separator, such polytetrafluoroethylene film has a fine pore size, e.g., of the order of about 0.1 to about 10 $\mu$. If larger particles of filler substance than 10 $\mu$ are employed, thus providing in the final polytetrafluoroethylene film pores larger than 10 $\mu$ in size, and such a film is employed in a high energy density battery such as a silver-zinc or nickel-zinc battery, there would be an increased tendency toward zinc dendrite penetration into the polytetrafluoroethylene separator film and increased tendency toward shorting. It is particularly noteworthy that the microporous polytetrafluoroethylene film produced according to the invention process is of substantially smaller pore size than the porous polytetrafluoroethylene films available commercially.

The flexible microporous polytetrafluoroethylene films produced according to the invention have very high porosity ranging from about 25 to about 90 percent, for example about 50 percent, the pores of the flexible film constituting a substantial or even major portion of the total area of the film.

Although the invention process results in the production of microporous polytetrafluoroethylene films which are readily wetted by alkali electrolyte to yield highly conductive separators, the polytetrafluoroethylene films thus produced retain their inertness to alkali, high resistance to oxidation and good thermal stability, and although highly flexible, have good strength, and particularly increased strength where the above mentioned rolling procedure is also employed.

Where the polytetrafluoroethylene film produced according to the invention process is to be employed as a separator in a high energy density battery utilizing an aqueous alkali electrolyte, such as aqueous KOH, and the filler substance is of a type which is leachable by alkali, such as zinc oxide, the sintered film containing the filler substance, particularly zinc oxide particles, can be directly incorporated into the battery, and the aqueous alkali contained therein will function to leach out the zinc oxide filler. Ordinarily, the presence of added dissolved zinc oxide in the battery electrolyte as result of such leaching out of the zinc oxide particles from the polytetrafluoroethylene film enhances battery performance of a battery involving a zinc anode.

Although the microporous polytetrafluoroethylene film produced according to the invention is particularly designed for use as a separator in a battery, especially a high energy density battery, it has been found that such microporous polytetrafluoroethylene films can also be employed as a gas, e.g., air or chlorine, or a liquid, filter due to the fine uniformly distributed pore structure of said polytetrafluoroethylene films.

The invention will be more clearly understood by reference to the description below of certain embodiments of the invention taken in connection with the accompanying drawings wherein.

The drawings are exaggerated for greater clarity.

The following are examples of practice of the invention.

EXAMPLE 1

An amount of 75 grams of U.S.P. grade zinc oxide having an average particle size of 0.3 $\mu$ is added with stirring to 300 cc deionized water. The mixture is stirred until a homogeneous suspension of the zinc oxide in the water is formed. A partial vacuum is applied for 20 minutes to remove any bubbles formed during mixing. Next, 53.2 grams of Dupont T-30B aqueous dispersion of polytetrafluoroethylene (60.4 percent solids content) is added to the zinc oxide dispersion slowly with gentle stirring. Twelve grams of glycerine is added to the resulting suspension, the glycerine preferably but not necessarily being added to slow down the drying process when most of the water is evaporated to maintain pliability of the subsequently cast film and thereby prevent cracking of the film during the subsequent sintering operation at elevated temperature.

The homogeneous slurry or aqueous dispersion of zinc oxide and polytetrafluoroethylene is poured on a Pyrex glass plate, and is drawn down by means of a doctor blade set at 0.038 cm (15 mils). The resulting film is air dried at ambient temperature for 15 hours. The dried mixture or film is then sintered at about 350° C. for 20 minutes. The resulting film has a thickness of 0.005 cm, approximately 2 mils, with zinc oxide particles distributed uniformly throughout the film.

The sintered film is cooled and removed from the glass plate and is soaked in acetone for about 3 minutes. Next, the film is soaked in methanol for about 3 minutes. Next, the film is soaked in methanolic KOH for about 5 minutes. Finally, the film is soaked in 30 percent aqueous KOH solution. Treatment in the latter solution is carried out for about 1½ hours. All of the above treatments in acetone, methanol, methanol-KOH and aqueous KOH solution are carried out at ambient (room) temperature.

Figure 1:
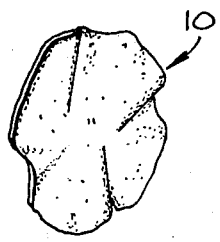
FIG. 1 illustrates a flexible microporous polytetrafluoroethylene flexible membrane produced according to the invention.

The resulting microporous polytetrafluoroethylene film is white, of good strength, highly flexible, as indicated at 10 in FIG. 1 of the drawing, and has a highly uniform distribution of pores having an average pore diameter of about 0.3 $\mu$, corresponding to the particle size of the zinc oxide particles previously distributed throughout the film and removed in the above described leaching procedure. The porosity of the film is about 48 percent, and the film has a thickness of about 2 mils. The polytetrafluoroethylene film has high flexibility and strength and has excellent stability in varying concentrations of KOH at 50° C.

After sintering and prior to treatment with alkali, the resistivity of the polytetrafluoroethylene film containing zinc oxide particles distributed therein is 5,918 ohm-cm and following treatment with alkali, the resulting microporous flexible polytetrafluoroethylene film free of the zinc oxide particles has a resistivity of 6.5 ohm-cm.

Figure 2:
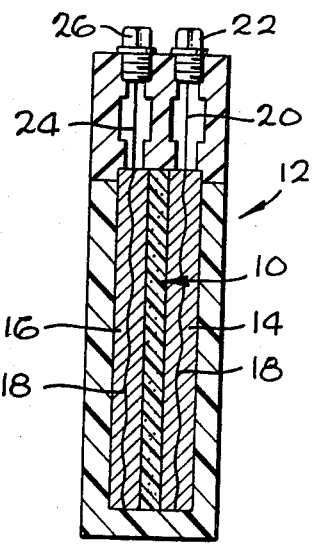
FIG. 2 shows assembly of the flexible membrane of FIG. 1 as a separator in a single cell battery according to the invention.

The resulting film at 10 in FIG. 1 is assembled in a battery 12 illustrated in FIG. 2, together with zinc and silver electrodes 14 and 16, respectively, the flexible separator 10 being disposed between the electrodes and in contact with the adjacent surfaces thereof.

Each of the electrodes 14 and 16 has a collector grid 18 therein, the collector grid of the zinc electrode 14 being connected by a lead wire 20 to a terminal 22, and a collector grid 18 of the silver electrode 16 being connected by a lead 24 to a terminal 26 on the battery. A 30 percent potassium hydroxide solution is employed as electrolyte in the battery.

The battery operates successfully both at 25° C. and at 100° C. as a secondary silver-zinc battery over a large number of charge-discharge cycles.

EXAMPLE 2

The procedure of Example 1 is followed, except that after sintering and prior to treatment in the acetone solution, the sintered film is cooled to about 220° C. and rolled using a stainless steel rod 1½ inch diameter by rolling the rod over the sintered zinc oxide-polytetrafluoroethylene film 10 times both in the longitudinal and transverse directions. Such rolling is carried out for a period of about 10 minutes.

Following rolling, the film is cooled and removed from the plate and then is subjected to treatment in the acetone, methanol, methanolic KOH and finally aqueous KOH solution, as described in Example 1.

The resulting flexible microporous polytetrafluoroethylene film has substantially the same properties as the polytetrafluoroethylene film produced in Example 1, except that as result of the rolling procedure in the present example, the resulting polytetrafluoroethylene film has a fibrillar structure and has significantly higher strength of the order of about two to four times the strength of the microporous polytetrafluoroethylene film of Example 1.

EXAMPLE 3

The procedure of Example 1 is repeated except that a suspension in 150 grams water of 37.5 grams U.S.P. grade zinc oxide of 0.3 $\mu$ average particle size, 26.6 grams T-30B aqueous polytetrafluoroethylene emulsion, and 7 grams glycerine are employed, the weight proportion of zinc oxide to polytetrafluoroethylene being about 70:30.

Sintering of the film is carried out at 350° C. for 20 minutes, and after sintering and cooling of the polytetrafluoroethylene film containing the zinc oxide particles, the film is removed from the glass plate, turned over and smoothed over the glass plate. A second layer of the aqueous mixture of zinc oxide particles and polytetrafluoroethylene particles is drawn down over the first film layer in the same manner as the first layer described in Example 1. Drying and sintering of the second layer of film is then carried out in the same manner as the first layer. Finally, a third layer of the slurry of zinc oxide and polytetrafluoroethylene particles is cast directly over the second layer and is dried and sintered in the same manner as the first two layers.

The resulting three layer film is removed from the plate and is then subjected to treatment in the acetone, methanol, methanolic KOH and aqueous KOH solutions as in Example 1.

The resulting microporous polytetrafluoroethylene film has substantially the same properties as the microporous polytetrafluoroethylene film in Example 1, but has a thickness of about 4.1 mils. This film has a highly uniform distribution of pores of an average size of about 0.3 $\mu$, and a porosity of about 48 percent. Such three layer microporous polytetrafluoroethylene film has resistivity which is reduced from 18,000 ohm-cm, the resistivity of the film following sintering, to only 7.6 ohm-cm of the final polytetrafluoroethylene film following treatment in the aqueous KOH solution and removal of zinc oxide, as measured by means of the resistivity measuring equipment described in A. J. Salkin and J. J. Kelley, "Electrical Resistance-Alternating Current Method" characteristics of separators for alkaline silver oxide-zinc secondary batteries, edited by J. E. Cooper and A. Fleischer, Air Force Aero Propulsion Laboratory.

EXAMPLE 4

The procedure of Example 1 is repeated, except that the film, following sintering, is soaked only in a 30 percent aqueous KOH solution at a temperature of about 100° C. for a period of about 3 hours.

The resulting microporous polytetrafluoroethylene film from which the zinc oxide particles have been removed has substantially the same properties as the microporous polytetrafluoroethylene film of Example 1, but has a slightly lower ionic conductivity.

Example 5

The procedure of Example 1 is followed up to formation of the sintered film, except that the suspension of zinc oxide is replaced by a suspension of cadmium oxide, the particles of cadmium oxide having an average size of about 1 $\mu$, and also employing 75 grams of the cadmium oxide in the suspension and the same amount of water as in Example 1.

The sintered film is then soaked in a 25 percent nitric acid solution to leach out the particles of cadmium oxide.

A microporous flexible polytetrafluoroethylene film is produced having similar properties to that of Example 1, including high ionic conductivity, such film having an average pore size of about 1 $\mu$ and a porosity of about 41 percent.

EXAMPLE 6

The procedure of Example 1 is followed up to formation of the sintered film, except that the suspension of zinc oxide is replaced by a suspension of nickel oxide, the particles of nickel oxide having an average size of about 2 $\mu$, and employing 125 grams of the nickel oxide in the suspension and the same amount of water as in Example 1.

The sintered film is then soaked in a 25 percent nitric acid solution to leach out the particles of nickel oxide.

A microporous flexible polytetrafluoroethylene film is produced having similar properties to that of Example 1, including high ionic conductivity, such film having an average pore size of about 2 $\mu$, and a porosity of about 54 percent.

EXAMPLE 7

The procedure of Example 1 is followed except that the suspension of zinc oxide is replaced by a suspension of PbO, the particles PbO having an average size of about 0.15 $\mu$, and also employing 75 grams of the PbO in the suspension and the same amount of water as in Example 1.

A microporous flexible polytetrafluoroethylene film is produced having similar properties to that of Example 1, including high ionic conductivity, such film having an average pore size of about 0.15 $\mu$ and a porosity of about 53 percent.

EXAMPLE 8

The procedure of Example 3 is substantially repeated up to formation of the three layer sintered polytetrafluroroethylene film containing the zinc oxide particles, employing a proportion of 70 parts of zinc oxide and 30 parts of polytetrafluoroethylene by weight in the initial slurry used for casting the film. During casting of each of the respective layers of film, the doctor blade is adjusted to obtain a single material film thickness of about 1.5 mils, so that the three layer film has a total thickness of 4.5 mils.

Figure 3:
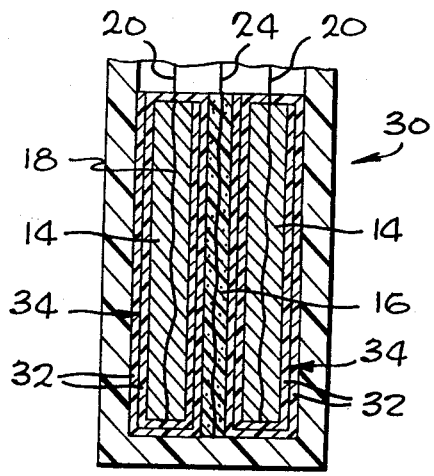
FIG. 3 illustrates a three plate battery employing flexible polytetrafluoroethylene films according to the invention, as separators.

A silver-zinc battery indicated at 30 in FIG. 3 of the drawing, is assembled, containing two negative zinc electrodes 14 and one positive electrode 16. The three layer flexible sintered polytetrafluoroethylene film containing zinc oxide particles, produced as described above, and indicated at 32, is spirally wrapped twice around each zinc electrode 14 to form the flexible separator unit 34 having a total thickness of about 9 mils. Thirty percent aqueous KOH is employed as electrolyte solution in the battery.

Upon addition of the aqueous electrolyte solution to the battery and after a period of about 24 hours of operation of the battery at 30° C., according to the cycling regime noted in the table below, the zinc oxide particles distributed in each of the polytetrafluoroethylene separators 34 wrapped around each of the zinc electrodes 14, is leached out of the film, and into the battery electrolyte. Leaching of the zinc oxide from the separators 34 is completed in about 24 hours, approximately following 12 cycles of operation of the battery. The parameters and details of cycling of this battery are set forth in Table I below.

TABLE I

| | |
|---|---|
| Initial Capacity: | 1.43 Ampere hours |
| Initial Plateau Voltage: | 1.23 volts |
| Cycling Regime: | A ¼ hr. discharge at C/2 rate |
| | 1½ hr. charge at C/5 rate |
| End of discharge: | |
| Voltage on Various Cycles: | Cycle 24   1.31 |
| | 84   1.37 |
| | 143   1.45 |
| | 249   1.42 |
| | 379   1.42 |
| | 427   1.42 |
| Total Cycles Completed: | 454 |

The test results in the table above show that the microporous flexible polytetrafluoroethylene separators 34 produced according to the invention, function efficiently over a large number of charge-discharge cycles, and that leaching of the zinc oxide in the aqueous alkali electrolyte of the battery itself can be accomplished advantageously.

As illustrated in FIGS. 2 and 3 of the drawing, it will be understood that one or a plurality of negative electrodes, such as zinc electrodes 14, and one or a plurality of positive, e.g. silver, electrodes such as 16, with a microporous polytetrafluoroethylene flexible separator produced according to the invention, such as 10 or 34, between adjacent pairs of negative and positive electrodes, can be provided to form either single plate or multiplate batteries, having improved electrical performance.

From the foregoing, it is seen that the invention provides production of a novel, microporous flexible polytetrafluoroethylene film, of particular advantage for use as a battery separator having high ionic conductivity.

While we have described particular embodiments of the invention for purposes of illustration, it will be understood that various changes and modifications can be made therein within the spirit of the invention, and the invention accordingly is not to be taken as limited except by the scope of the appended claims.

We claim:

1. The process for preparing a high strength flexible microporous polytetrafluoroethylene film of high ionic conductivity and having uniformly distributed pores, which comprises forming an aqueous homogeneous dispersion of particles of polytetrafluoroethylene and particles of a substance insoluble in water and which does not precipitate or coagulate polytetrafluoroethylene from aqueous dispersion, and which when incorporated into a polytetrafluoroethylene film can be removed therefrom to form a porous film, casting a film of said dispersion, drying said film, sintering said dried film at temperature at which substantially no decomposition of said polytetrafluoroethylene occurs, resulting in a polytetrafluoroethylene film with particles of said substance bonded by and uniformly distributed in said film, rolling said sintered polytetrafluoroethylene film to form a fibrous polytetrafluoroethylene structure, and removing said particles of said substance from said polytetrafluoroethylene film without otherwise adversely affecting said polytetrafluoroethylene film, thereby producing a strengthened polytetrafluoroethylene film having uniformly distributed pores therein.

2. The process as defined in claim 1, including removing said particles of said substance from said polytetrafluoroethylene film by dissolution or leaching of said last mentioned particles from said film.

3. The process as defined in claim 1, employing particles of a substance in the form of a metal or a compound leachable in alkali or acid, said particles of said substance being removed from said sintered polytetrafluoroethylene film by treatment with alkali or acid.

4. The process as defined in claim 1, said particles of substance being selected from the group consisting of zinc, zinc oxide, nickel, nickel oxide, cadmium, cadmium oxide, silver, silver oxide, lead oxide, lead carbonate, silica, glass fibers, and mixtures thereof, said particles of said substance being removed from said film by leaching with alkali or acid.

5. The process as defined in claim 1, including forming said dispersion by mixing an aqueous suspension of said particles of said substance with an aqueous emulsion of said polytetrafluoroethylene.

6. The process as defined in claim 5, employing an aqueous suspension of zinc oxide and an aqueous emulsion of polytetrafluoroethylene.

7. The process as defined in claim 6, said mixture of zinc oxide and polytetrafluoroethylene containing about 50 to about 95 percent of said zinc oxide particles and about 50 to about 5 percent of polytetrafluoroethylene, by weight.

8. The process as defined in claim 1, said particles of said substance being particles of zinc oxide, said particles of zinc oxide being removed from said sintered polytetrafluoroethylene film by treatment of said sintered film with alcoholic alkali, and then with aqueous alkali.

9. The process as defined in claim 1, said particles of said substance being particles of zinc oxide, said particles of zinc oxide being removed from said sintered polytetrafluoroethylene film by treating said sintered film first with acetone, then with methanol, then with methanolic KOH, and finally with a aqueous solution of KOH.

10. The process as defined in claim 7, including forming said mixture of particles of zinc oxide and polytetrafluoroethylene by adding an aqueous emulsion of polytetrafluoroethylene to an aqueous suspension of zinc oxide, said zinc oxide particles having a particle size ranging from about 0.1 to about 10 $\mu$ and said polytetrafluoroethylene having a particle size ranging from about 0.01 to about 10 $\mu$, said drying of said polytetrafluoroethylene film being carried out at temperature of about 40° to about 100° C. for a period of from about 2 to about 24 hours, said sintering of said polytetrafluoroethylene film being carried out at temperature of about 100° to about 375° C. for a period from about 10 minutes to about 2 hours.

11. The process as defined in claim 10, said sintering of said polytetrafluoroethylene being carried out at temperature ranging from about 230° to about 275° C., and including soaking said sintered film in acetone, then soaking said film in methanol, then soaking said film in saturated methanolic KOH, and finally soaking said polytetrafluoroethylene film in aqueous KOH solution.

12. A microporous flexible high strength polytetrafluoroethylene battery separator film, said film having high ionic conductivity, resistance to alkali electrolyte, high resistance to oxidation and good thermal stability, produced by the process of claim 1.

13. A microporous flexible high strength polytetrafluoroethylene battery separator film, said film having high ionic conductivity, resistance to alkali electrolyte, high resistance to oxidation and good thermal stability, produced by the process of claim 9.

14. A microporous flexible polytetrafluoroethylene battery separator film, said film having high ionic conductivity ranging from about 5 to about 15 ohm-cm, high strength, resistance to alkali electrolyte, high resistance to oxidation, good thermal stability, highly uniform pore distribution with porosity ranging from about 25 percent to about 90 percent, and a film thickness ranging from about 0.2 to about 50 mils, produced by the process of claim 11.

15. A battery having a pair of electrodes of opposite polarity and a porous separator between said electrodes for retaining electrolyte and permitting transfer of electrolyte ions while inhibiting migration of electrode ions, said separator being a microporous flexible polytetrafluoroethylene film as defined in claim 12.

16. A battery having a pair of electrodes of opposite polarity and a porous separator between said electrodes for retaining electrolyte and permitting transfer of electrolyte ions while inhibiting migration of electrode ions, said separator being a microporous flexible polytetrafluoroethylene film as defined in claim 14.

17. A battery as defined in claim 16, said electrodes being zinc and silver electrodes.

18. The process for preparing flexible microporous polytetrafluoroethylene film of high ionic conductivity and having uniformly distributed pores, which comprises forming polytetrafluoroethylene film homogeneous dispersion of particles of polytetrafluoroethylene and particles of zinc oxide, casting a film of said dispersion, drying said film, sintering said dried film at temperature at which substantially no decomposition of said polytetrafluoroethylene occurs, resulting in a polytetrafluoroethylene film with said particles of zinc oxide bonded by and uniformly distributed in said film, and removing said particles of zinc oxide from said sintered polytetrafluoroethylene film by treating said sintered film first with a ketone, then with an alcohol, then with alcoholic alkali, and finally with an aqueous solution of alkali, thereby producing a polytetrafluoroethylene film having uniformly distributed pores therein.

19. The process as defined in claim 18, including rolling said sintered polytetrafluoroethylene film prior to removing said particles of said zinc oxide, to form a fibrous polytetrafluoroethylene structure binding said particles of said zinc oxide.

* * * * *